E. A. HAILWOOD.
APPARATUS FOR IGNITING MINERS' SAFETY LAMPS.
APPLICATION FILED DEC. 8, 1908.

993,362.

Patented May 30, 1911.
9 SHEETS—SHEET 1.

WITNESSES
W. P. Burke
A. F. Heuman

INVENTOR
Ernest Arthur Hailwood
BY Wm Wallace White
ATTY.

E. A. HAILWOOD.
APPARATUS FOR IGNITING MINERS' SAFETY LAMPS.
APPLICATION FILED DEC. 8, 1908.

Patented May 30, 1911.

E. A. HAILWOOD.
APPARATUS FOR IGNITING MINERS' SAFETY LAMPS.
APPLICATION FILED DEC. 8, 1908.

993,362.

Patented May 30, 1911.

WITNESSES

INVENTOR
Ernest Arthur Hailwood

E. A. HAILWOOD.
APPARATUS FOR IGNITING MINERS' SAFETY LAMPS.
APPLICATION FILED DEC. 8, 1908.

993,362.

Patented May 30, 1911.

WITNESSES
W. P. Burk
A. F. Heuman.

INVENTOR
Ernest Arthur Hailwood
BY Wm Wallace White
ATTY.

E. A. HAILWOOD.
APPARATUS FOR IGNITING MINERS' SAFETY LAMPS.
APPLICATION FILED DEC. 8, 1908.

993,362.

Patented May 30, 1911.
9 SHEETS—SHEET 6.

WITNESSES
W. P. Burke
A. F. Heuman

INVENTOR
Ernest Arthur Hailwood
BY Wm Wallace White
ATTY.

E. A. HAILWOOD.
APPARATUS FOR IGNITING MINERS' SAFETY LAMPS.
APPLICATION FILED DEC. 8, 1908.

993,362.

Patented May 30, 1911.

WITNESSES
W. P. Burke
A. F. Heuman

INVENTOR
Ernest Arthur Hailwood
BY Wm Wallace White
ATTY.

E. A. HAILWOOD.
APPARATUS FOR IGNITING MINERS' SAFETY LAMPS.
APPLICATION FILED DEC. 8, 1908.

993,362.

Patented May 30, 1911.

WITNESSES
W. P. Burke
A. F. Heuman

INVENTOR
Ernest Arthur Hailwood
BY Wm Wallace White
ATTY.

E. A. HAILWOOD.
APPARATUS FOR IGNITING MINERS' SAFETY LAMPS.
APPLICATION FILED DEC. 8, 1908.

993,362.

Patented May 30, 1911.
9 SHEETS—SHEET 9.

WITNESSES

INVENTOR
Ernest Arthur Hailwood
BY Wm Wallace White
ATTY.

UNITED STATES PATENT OFFICE.

ERNEST ARTHUR HAILWOOD, OF MORLEY, NEAR LEEDS, ENGLAND.

APPARATUS FOR IGNITING MINERS' SAFETY-LAMPS.

993,362.　　　　　Specification of Letters Patent.　　Patented May 30, 1911.
Application filed December 8, 1908. Serial No. 466,519.

*To all whom it may concern:*

Be it known that I, ERNEST ARTHUR HAILWOOD, a subject of the King of Great Britain and Ireland, whose postal address is 7 Gladstone Terrace, Morley, near Leeds, in the county of York, England, have invented certain new and useful Improvements in Apparatus for Igniting Miners' Safety-Lamps, of which the following is a specification.

My invention has reference to improvements in apparatus for igniting miners' safety lamps, especially suitable for use in the underground workings of mines, and in the like places, and in connection with which apparatus I have already been granted British Patents, Nos. 21009 of 1905, 25258 of 1906, and 12274 of 1907, and has for its object the arrangement and construction of apparatus and working portions thereof, for use, preferably, in underground workings of mines and the like, in such a manner that same cannot be readily tampered with, with a view to obtaining sparks therefrom.

In describing my invention in detail, reference is made to the accompanying sheets of drawings, similar letters and numerals where possible indicating similar parts, in which, Figs. 1$^a$ and 2$^a$ represent portions of the apparatus shown in Figs. 1 and 2, showing modifications therein. Fig. 2$^x$ is a sectional view showing the means for operating a dynamo by the means for operating the chamber. Fig. 3$^a$ represents a sectional elevation showing an apparatus embodying the major portions of the various details hereinafter described and set forth. Fig. 6 represents another form of apparatus. Figs. 7 and 8 are plan views showing details of mechanism shown in Fig. 6. Fig. 8$^a$ represents a buffer stop hereinafter referred to. Fig. 9 shows a form of sliding door, together with other modifications hereinafter referred to.

Fig. 10$^a$ represents a plan of a guard plate.

In carrying my invention into effect, I employ in one form of a device (Figs, 1, 1$^a$, 2, 2$^a$ and 3$^a$,) a preferably cylindrical chamber A, which is made a sliding fit within an outer chamber B. The chamber A is provided with a base plate or piece A$^1$ having an insulated contact piece or push C, connected thereto and to a convenient source of electrical energy. Toward the upper extremities of the inner chamber A, I arrange strong inner doors D, formed preferably in two portions for this form of my invention, each portion being hinged to the walls of the chamber A. When closed, the door edges D$^1$ will rest against the sides of the chamber B. Springs D$^2$ placed in guarded recesses D$^3$ in the walls of chamber A will press against the doors D, so as to tend to open same, but as the back portions D¹ of the doors are squared off, the doors cannot open so long as the said edges are confined by the walls of the chamber B. The chamber B may be enlarged as shown at B¹, to provide a sloping portion B² permitting on the operation of the apparatus the automatic opening of doors D, and insuring the closing of the same as the chamber A returns to its lowest position.

Figure 1:
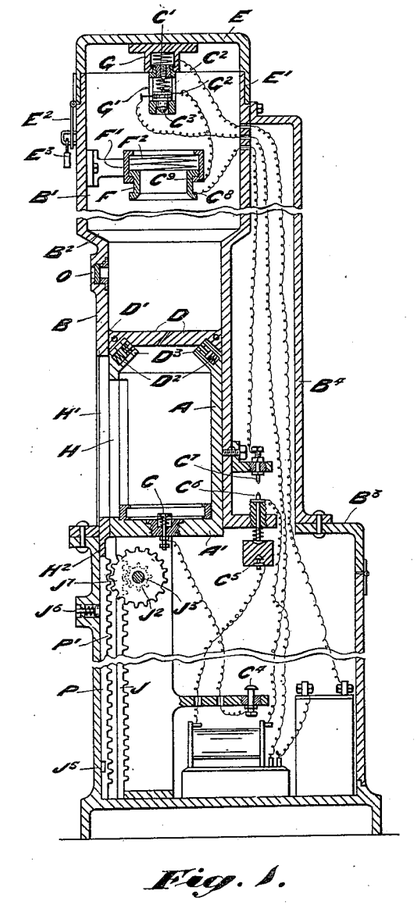
Figure 1 represents a sectional elevation of one form of apparatus.
Figures 1A, 2A:
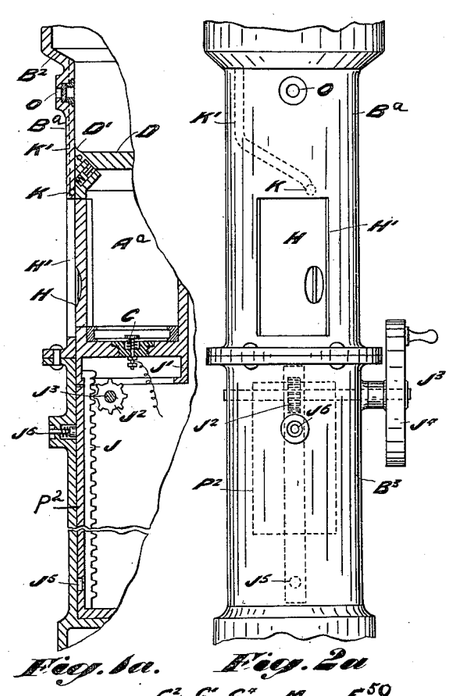

The upper or enlarged portion B¹ of chamber B is provided with a detachable cap or cover E, a halved joint being formed as at E¹. The cap E is provided with a hinged fastening device or hasp E² which may embrace a staple or the like formed on the chamber B¹, and the whole may be secured by a padlock E³. The cap E contains or protects upper insulated pushes or contact pieces hereinafter described, and a contact ring F for engaging a lamp ring or projection thereon. The upper push may be a simple terminal, to be pressed home and contact made by the top ring or eye of a lamp, thus closing either or both primary and secondary circuits, but in order to make tampering with the apparatus more difficult, I prefer to use a push switch which can only be operated by the top ring or eye bolt of the lamp or the like, one portion of a push piece coming into contact with the lamp body, and the other with the eyebolt of the lamp handle, and the upward pressure, of the lamp body causes the final contact with such switch to be made. A form of switch which will answer this purpose is shown in Figs. 1 and 3ª, wherein a flange ring G carries a sliding flange ring G¹ which projects downward toward the chamber B¹. In the ring G is mounted an insulated contact piece C¹ held against the ring G¹ by means of a spring and in the flange ring G¹ is mounted a terminal piece provided with a contact C², and an insulated push piece C³. A spring is mounted between the contact pieces C¹ and C², and the various contacts and terminal screw G² are suitably connected in the electric circuit, the contact C² being free to slide in the ring G¹. As the eye of a lamp is caused to enter the flange ring G¹, the contact or push piece C³ is pressed upward, but the spring between the contacts C¹ and C² keeps them apart, the spring above the contact piece C¹ being weaker than that below. When, however, the lamp top comes in contact with the ring G¹, the contact pieces C¹ and C² are pressed together, the circuit is completed, and a current may flow from the ring G¹ or contact C³ (according to which circuit is connected to same) through the lamp. If an article minus the eyebolt or its equivalent, be used, the contacts C¹ and C² would remain asunder owing to the protection afforded by ring G¹. The contacts would also remain open if an article shorter than the usual lamp be placed in the apparatus.

Figure 29:
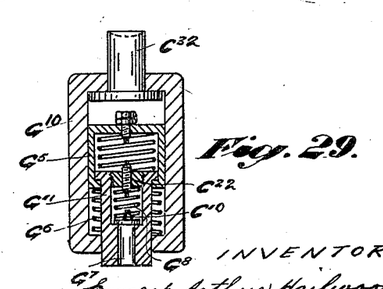
Fig. 29 represents a detail of a lamp eyelet switch.

Fig. 29 shows a further eye bolt operated switch in which a flange ring or casing G¹⁰ carries a sliding hollow flange G¹¹, which projects downward to chamber B¹ or A depending on the type of apparatus with which it is used. An insulated double terminal piece C²² is mounted in flange G¹¹. The flange G¹¹ is carried in a sliding casing G⁵ also carried in casing G¹⁰, a spring pressing the flange G¹¹ downward while a spring G⁶ holds the casing G⁵ up. A push piece C³² is provided in casing G¹⁰. In the hollow-flange G¹¹ is mounted the eyebolt contact piece G⁷ held down by spring G⁸. Anything larger than the lamp eyebolt will not operate the contact G⁷, and thus the necessary circuits will not be completed.

Observation glasses O may be placed in any convenient position in the walls of the chamber B and B¹. A lamp admittance opening H¹ is formed in the chamber B, and the chamber A provided in one form with a hinged guard door H. This door may be hinged to its chamber, and is so arranged that same must close when the apparatus is operated.

Figure 2:
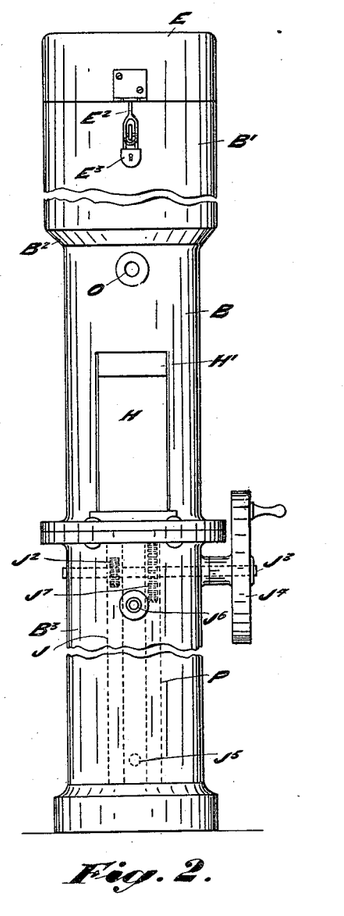
Fig. 2 represents a side elevation of the same.

In the forms shown in Figs. 1, 1ª, 2, 2ª, and 3ª the chamber A is caused to move up and down in the outer chamber B. This motion may be obtained in various ways. The inner chamber may be given a simple upward and downward movement, or may be caused to automatically turn around some distance as same rises. The first form is shown in Figs. 1 and 2, and the latter in Figs. 1ª 2ª and 3ª. With regard to Figs. 1 and 2, the inner chamber may carry a depending rack or the like J, with which gears a small pinion J² mounted on shaft J³ carrying a suitable balance wheel and handle J⁴, whereby the gearing may be operated. It is very desirable to cover the opening H¹ in order that the contents may be protected from being tampered with, or from dust, and to accomplish this purpose a guard plate is provided. This plate H² is mounted in the casing or walls of the apparatus, and is automatically caused to move upward quicker than the chamber A by means of large pinion J⁷ mounted on shaft J³, engaging rack P¹ carried on plate P. Thus, when the chamber A is raised, a portion of its required distance, the aperture H¹ is closed or guarded. In the form shown in Figs. 1ª 2ª and 3ª, the rack P¹ and pinion J⁷ may be discarded, and the pinion J² will engage the rack J, having its upper portion engaging with an annular recess J¹ mounted on or attached to the base of the chamber Aª, in such a manner as to allow the chamber Aª to be turned or revolved without interfering with the rising and falling movement. In this case, the chamber Aª is provided with a knob or stud K, and an inclined recess K¹ is formed in the walls of chamber B$^a$. As the chamber A$^a$ rises, the knob K will travel in recess K¹, and revolve the chamber A$^a$. This will insure the door H, when same is hinged at the side, being tightly and automatically closed. In order to guard the aperture H¹, the rack J will carry a semi-circular plate P² and this plate will rise with the rack and close the said opening. When I employ a rotating motion in connection with the chambers, the sloping portion B² may be placed in the line of horizontal rotation so that at a given point the hinged doors will be released somewhat in manner aforesaid. The rack J or plate P may be provided with notches J⁵ with which may engage a spring acting locking piece J⁶ mounted in the walls of the apparatus, whereby the gearing, and thus the chamber A$^a$, may be locked in any desired position. The locking piece J⁶ will be withdrawn by a suitable key. In place however of using a device such as that hereinbefore described, coin freed mechanism may be used, whereby the insertion of a metal tally will cause an electromagnet to draw out a catch and free the mechanism for use. The number of tallies will indicate the number of times the apparatus has been used, and who has used same. Any suitable form of coin freed mechanism may be used, that shown in Figs. 3$^a$ and 25 will answer the purpose, in which a sloping aperture X for the admission of the tally or the like will direct the tally on to a spring balanced arm X¹ which may be balanced to suit the weight of the tally, which will fall down a slide X² on to balanced lever X³ carrying contact X⁴ which will close against contact X⁵, and cause a current to flow around electromagnet X⁶ and draw the locking piece J⁶ from the notch J⁵. In Fig. 3$^a$ the piece J⁶ is withdrawn by mechanical means. In the guard or lamp chamber or other moving portion of the apparatus will be formed notches X⁹ into which a spring piece X⁷ will project and as the chamber is moved, a spring piece X⁷ will travel outward, pushed by the cam-like projection, tighten the cord X⁸ and move the lever X³ sufficiently to displace the tally; thus the tally will cause the locking piece J⁶ to be withdrawn while the device is operated. The return of the chambers to their original position resetting the coin operated mechanism and re-locking the chambers. In place of using this device for unlocking the apparatus or gearing, same may be used to close the electric circuit, when the lamp is in position for its ignition.

Figure 34:
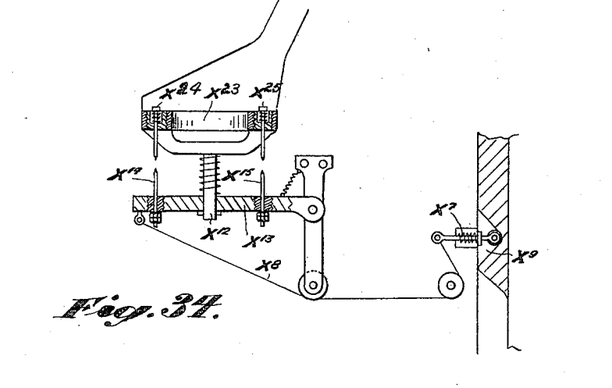
Fig. 34 represents a further form of coin freed or actuated device.

Another coin or tally freed or actuated mechanism is shown in Fig. 34, in which a coin or tally will bridge contacts X²⁴ and X²⁵ on the lever pan X²³, which is carried by spring arm X¹² on tipping arm X¹³, the latter arm being provided with contacts X¹⁴ and X¹⁵, the weight of the coin or tally causing the contacts X²⁴, X²⁵, X¹⁴ and X¹⁵ to meet. The cord X⁸ and spring piece X⁷ are arranged similarly to those shown in Fig. 25.

From the rack or the like J is carried an insulated contact piece C⁴, and as same travels upward, it will be caused to come in contact with a secondary contact piece C⁵, mounted preferably on the chamber B. As the contact piece C⁴ moves farther up, contact C⁵ will also move up a contact C⁶ into electric connection with another contact C⁷. These latter contacts are in the primary circuit, and when the chamber A has reached the limit of its upward travel, the contacts C⁴ and C⁵, C⁶ and C⁷ will all be in engagement. Suitable springs will return the contacts to their normal position, as the chamber A is lowered. In order to further guard the upper contacts, C¹, C², and C³, I may support from the chamber B¹, a ring F, about (as regards its internal diameter) the diameter of a lamp, so that anything larger than a lamp will not pass through, and should anything less than a lamp be used, the ring F would not be moved, which is necessary in order to insure the circuits being completed. The said ring F which carries an insulated contact piece C⁸ is mounted in a ring F¹ and free to slide therein, the ring F¹ carrying a contact piece C⁹. A spring F² causes the contacts to be normally separated. The eye or projecting ring on the lamp top will close the upper contacts, the contact C³ being in the form of an inverted cup of a size adapted to receive nothing larger than the lamp eye. The lamp itself will operate the ring F, and as has been described, the doors D will open and close automatically on the operation of the chamber A.

The chamber B may be attached in any convenient manner to the sides or top of a further chamber B³ carrying the accumulators, dynamo, induction coil or source of electrical energy. In order to guard the wires and contacts, and the like, a further casing B⁴ may be attached to the parts, or the wires may be run in covered recesses or tubes in the chambers, as desired the tube B$^{4x}$ being shown in Fig. 3$^a$ and the recess B$^{4a}$ in Figs. 6 and 8.

Figures 6, 7, 8, 8A, 9:
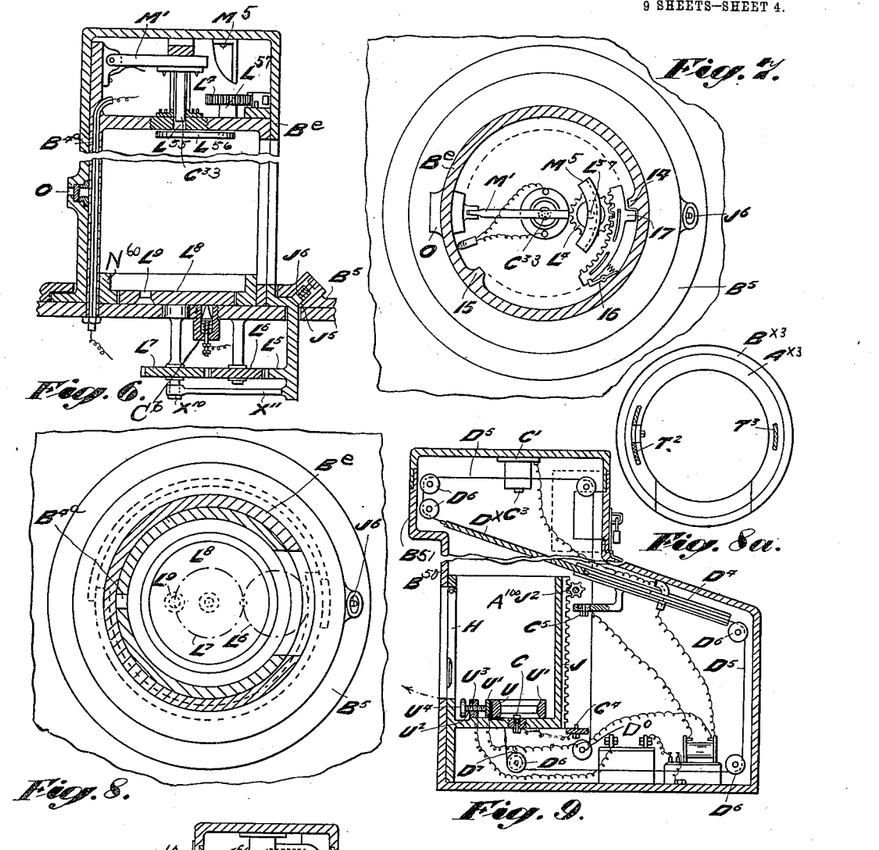

In place of hinging the doors D as hereinbefore described, same may be made to slide, and a form of mechanism for accomplishing this purpose is shown in Fig. 9, which also serves to show a form of clip ring for the lamp vessel, hereinafter referred to, and shown in plan in Fig. 13 in a slightly modified form.

The chamber A¹⁰⁰ is actuated by a pinion J² meshing with a rack J formed on the chamber walls. The door D$^x$ is mounted in suitable slides at the sides of the chamber B⁵⁰ and B⁵¹, and guides D⁴ are provided in an extended portion of the casing. Cords D⁵ pass over pulleys D⁶, one end of a cord being attached to one end of the door, the other end, to a pulley D⁰. One end of the other cord is attached to one end of the door Dˣ, and the other end to the moving chamber A¹⁰⁰. As the chamber rises, the door Dˣ is caused to automatically slide on its guides D⁴ and uncover the top of chamber A¹⁰⁰, and allow the lamp to operate the upper or eye push, hereinbefore described. The electric circuits may be arranged in any convenient manner.

Figure 2X:
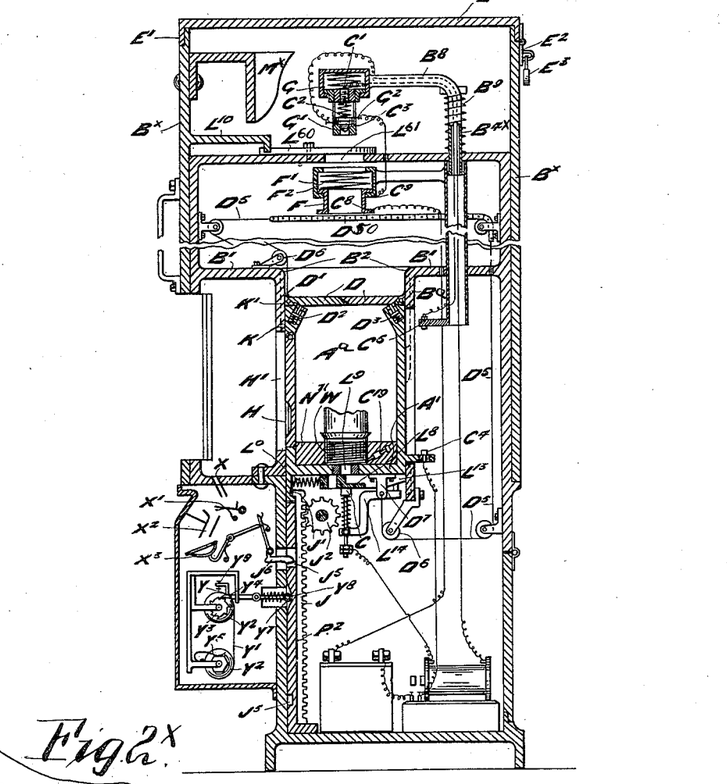

The gearing for operating the mechanism such as that described with reference to Figs. 1 and 2, may be geared to mechanism for operating a dynamo or magneto machine, so that the operation of the movable chamber or chambers may simultaneously operate such generator as for instance the shaft of pinion J² may be in gear with a dynamo shaft, see Fig. 2ˣ.

In Fig. 3ᵃ I have shown doors D in the hinged form and doors D⁵⁰ in the form of a chain operated by cords D⁵. As shown this door will be arranged to operate under the ring F and will act as a further guard.

Figure 3:
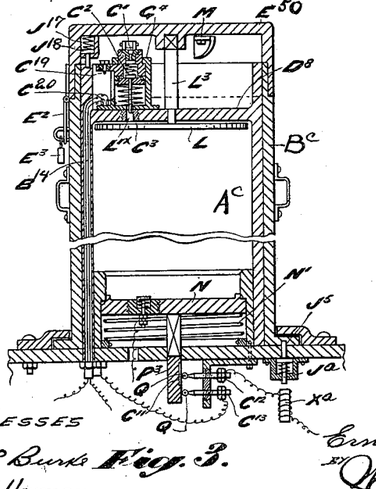
Fig. 3 represents a sectional elevation of another form of apparatus.
Figure 3A:
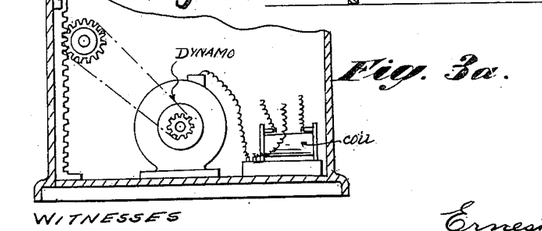

In a modification, Fig. 3, the chamber Aᶜ may be provided with a closed top D⁸, having therein a small aperture L¹ˣ, through which a downward projecting push piece may penetrate and make contact with the lamp in the chamber. This push piece may be in the form shown in Fig. 1, C³ being elongated in order to pass into the chamber Aᶜ. The aperture L¹ˣ may be guarded by the guard devices hereinafter referred to.

Figure 4:
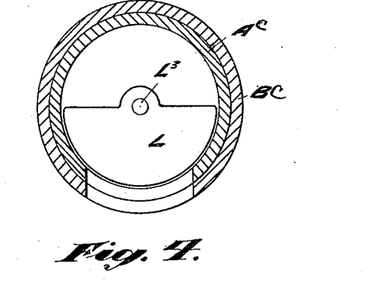
Fig. 4 represents a plan showing a push aperture guard plate.

Another form of inner guard which would be adapted is that shown in Figs. 3 and 4, in which a revolving plate L is mounted in the chamber Aᶜ. Such plate may be semi-circular, as shown in Fig. 4, and arranged to uncover an aperture L'ˣ in the upper end or cover of chamber Aᶜ. When semi-circular, the turning movement of the chamber will cause the aperture L'ˣ to be uncovered, and allow the upper contact C³ to penetrate into chamber Aᶜ. The plate L will be provided with an incline, to press back the contact C³ when the chamber is opened. The construction of this part of the case should be obvious, for instance, the flat edge of plate "L" may be beveled off in such a manner that it is impossible for such edge to jam or lock the end of contact C³, but instead the beveled edge would on the opening rotation of the chambers, cause the end of contact C³, to be gradually pressed upward. Instead, however, of attaching the upper contact pieces to the cover E⁵⁰, and sliding the chamber Aᶜ upward, the chamber Aᶜ may be mounted inside a chamber Bᶜ, capable of revolving about same, as shown in Fig. 3, and the upper contact pieces be mounted on the crown of chamber Aᶜ, over an insulated aperture, such as L'ˣ in the top of chamber Aᶜ. The cap E⁵⁰ will revolve with the chamber Bᶜ, and a guard plate such as L may be mounted on the arm L² carried by chamber Bᶜ or cap E⁵⁰. The form of contact shown in Fig. 3, will be found to be somewhat different to that shown in Fig. 1, in that the revolution of the chamber Bᶜ will cause a cam or the like M, mounted in the cap E⁵⁰ or chamber Bᶜ, to come in contact with the upper portion of contact piece C¹, mounted in a bracket G⁴, and press the contact piece C¹ downward. The sides of the contact piece holder will press down the contact piece C³ until same comes in contact with the lamp, when the contact C² on the other end of contact C³ will be pressed into contact with spring separated insulated contact C¹. At the same time a plug contact piece C¹⁹ will engage with a contact C²⁰ mounted on the base of bracket G⁴. A casing or tube B¹⁴ will carry the various wires through chamber Aᶜ. If the lamp be absent, or an article shorter than the lamp placed in the apparatus, the contacts C² and C¹ will not meet. If something taller than a lamp be used, then contacts C¹⁹ and C²⁰ will not meet. The chamber Bᶜ will be provided with a spring lock recess such as J¹⁷, and a spring stop J¹⁸ may be provided in the cap or like E⁵⁰, in order that the chamber Bᶜ be not turned too far, and to act as a buffer to press the chambers and push the cam out of engagement, so as to prevent waste of electric current.

Figure 22:
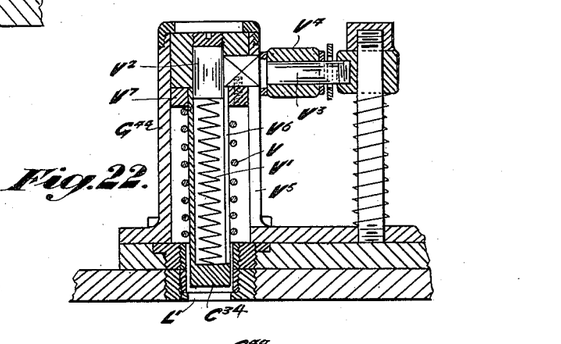
Figs. 22, 23, and 24, represent details of contact piece.
Figure 23:
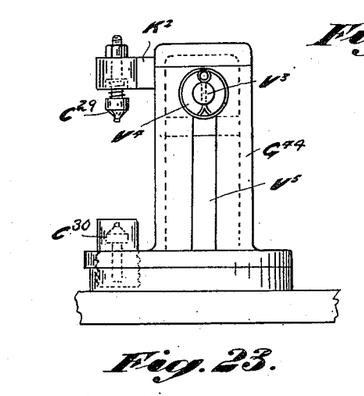
Figure 24:
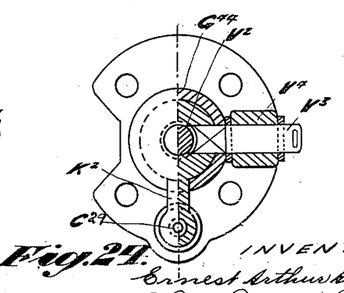
Figure 25:
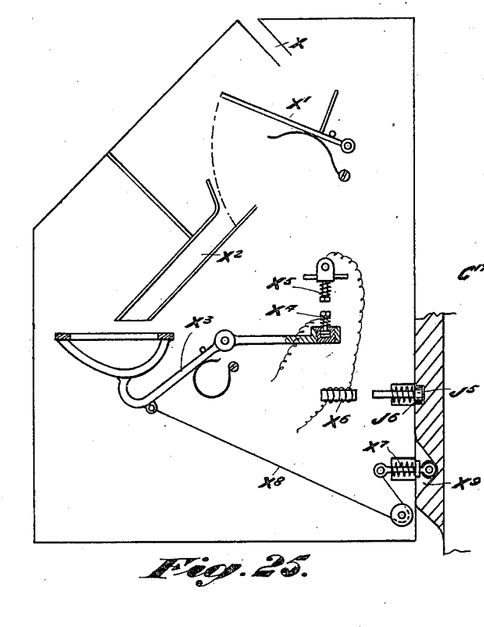
Fig. 25 represents a view of a coin freed locking device.

Various forms of upper contacts or switches may be used and operated by cams or the like. Figs. 22, 23, and 24, show details of a form of contact operated by a cam. Mounted in the plunger C³⁴ is a spring V¹, the upper end of which engages a plunger V² carrying an arm V³, on which is mounted a roller or cam contact piece V⁴. Slots V⁵ and V⁶ are formed in plunger C³⁴ and bracket G⁴⁴, and on the elbow K² is carried a contact piece C²⁹ which may come into contact with a contact C³⁰, mounted at the base of the bracket G⁴⁴. Upon the depression of the plunger C³⁴, the end of the same will come into contact with the lamp placed in the apparatus, the electric current traveling from contact C³⁰ to contact C²⁹, through plunger C³⁴ and then through the lamp to the base plate contacts or framework of the apparatus. With this form, if anything taller than a lamp is placed in the apparatus, the contacts C²⁹ and C³⁰ will not meet, the cam merely operating the plunger V². To reduce the effect of the side strain, a sleeve V⁷ surrounding plunger C³⁴ is attached to plunger V². Additional supports could be furnished, if necessary, by erecting an upstanding pillar passing through a hole or the like formed in the end of the roller arm V³, a coiled spring surrounding the pillar assisting in the recoil of the push, as shown in Fig. 22. The parts are suitably insulated from each other.

These modifications are shown in order to make clear that the contacts may be made in more ways than one, and that I do not confine myself particularly to the specific form although those shown have their advantages.

Fig. 3$^a$ shows the lamp eye operating switch carried on an arm B$^8$ of tube B$^{4x}$ and telescoped therein, a spring B$^9$ insuring the return of the switch after operating the apparatus, a cam M$^x$ pressing the arm B$^8$ down when the chamber B$^x$ is revolved, this operation taking place when the lamp chamber is in the final position.

Figure 5:
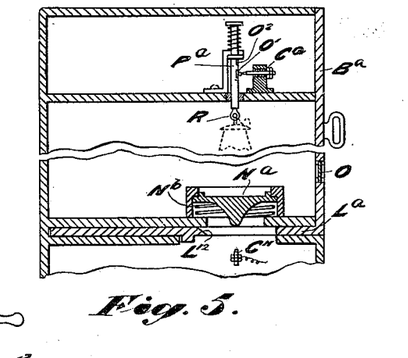
Figs. 5 and 5$^a$ represent elevation and plan showing another form of apparatus embodying a lamp suspension and retaining device on a lower internal guard.
Figure 5A:
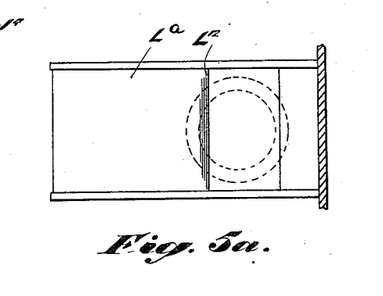

In Fig. 3 is also shown a lamp dish N, retained in an upward position by means of spring N$^1$, such spring being of such a strength as to only drop a certain distance under the weight of a lamp. The dish N carries an insulated contact bar P$^3$ having thereon a contact piece C$^{11}$, and in engagement with the contact piece C$^{11}$, are insulated contacts C$^{12}$ and C$^{13}$, provided with small bowls or wheels Q to reduce friction. The contacts C$^{11}$, C$^{12}$, and C$^{13}$, are so arranged that if an object on the dish N is less in weight than a lamp, one contact will be on the contact piece C$^{11}$, and the other on the insulated bar P$^3$. If the object is too heavy, the contacts will be clear of the contact piece C$^{11}$ in the other direction. A similar result may be obtained by suspending the lamp from a hook or eye such as R, (Fig. 5), carrying a contact bar P$^a$ and contacts C$^a$, the action being similar to that hereinbefore described, though in place of arranging the contacts as in Fig. 3, the spring bar P$^a$ need not be insulated, but carry insulated pieces O$^1$ and O$^2$, and in the normal position, the contact C$^a$ will engage the piece O$^1$, and when the correct weight is suspended from the hook, the contact C$^a$ will make contact with the bar P$^a$, and allow the current to flow through the bar to the lamp. This device is shown as applied to a chamber or apparatus having a sliding door B$^a$, and guard L$^a$. There is also shown a gravity lamp ring N$^a$ mounted on a spring N$^b$ of such a strength as to only allow a lamp placed on the dish to drop a certain distance somewhat similar to that referred to in Fig. 3. The base of ring N$^a$ is curved in order to be easily operated by the guard L$^a$ which is curved for this purpose at L$^{12}$, Fig. 5 and 5$^a$. The action of the apparatus will be readily understood from the drawing.

In the device shown in Fig. 3, the locking device J$^a$ may take the form of a bar withdrawn by an electromagnet X$^a$ connected through a shunt circuit to the terminal of contact C$^{12}$, and to the source of electrical energy, as will be understood from the drawing, the lamp admittance door in this instance being normally open.

Figure 12:
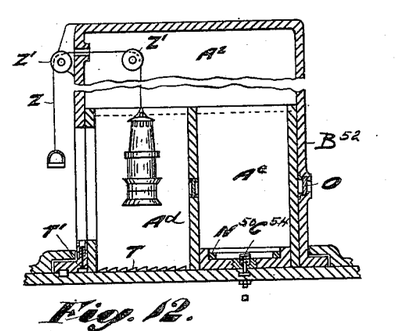
Fig. 12 represents a further form of apparatus.

Another form of what might be termed a gravity operated device is shown in Fig. 12, in which an outer revolving chamber B$^{52}$ contains two inner chambers A$^d$ and A$^e$. The lamp is placed in the chamber A$^d$, and attached to a cord or the like Z. The ring around which the outer chamber travels has formed thereon teeth T, and a spring catch T$^1$ is mounted in the base of the outer chamber to engage with said teeth in such a manner as to allow the outer chamber to be revolved in one direction only. The lamp is pulled up out of chamber A$^d$ into an upper chamber A$^2$, the outer chamber B$^{52}$ is then revolved a certain distance, until the lamp admission openings are closed. Then the lamp is lowered into chamber A$^e$. The pulleys Z$^1$ for holding the cord Z being attached to the outer chamber will cause the lamp to be brought over chamber A$^e$. When the lamp rests on its base ring or dish N$^{50}$, its weight will cause the contact C$^{54}$ to close a switch. The further movement of the outer chamber will close switches hidden in the flanges and complete the circuit and ignite the lamp. The rack T and catch T$^1$ may be applied, if convenient, to any of the revolving types of apparatus.

Fig. 6 shows another form of apparatus, in which inner or internal guard plates are employed for covering hidden pushes or switches, both above and below the lamp. The inner chamber is stationary, and the outer chamber or door revolves. The upper push aperture L$^{55}$ is guarded by means of plate L$^{56}$ which is carried on a stud L$^{57}$, which in turn carries a pinion L$^4$, said pinion engaging a small rack mounted on outer chamber B$^e$, a lug 17 at the back of the rack being engaged at a desired moment by lugs 14 and 15 on the inside walls of chamber B$^e$. A spring pawl 16 which normally locks the rack and pinion and guard plate in the closed position, is forced open by lug 15 just prior to said lug engaging the lug on back of rack. This prevents tampering with the guard plate. As the chamber B$^e$ revolves, the plate L$^{56}$ is moved, and uncovers the aperture L$^{55}$ and allows a cam to press the contact C$^{33}$ into engagement with the lamp. This contact and cam gearing will be seen to be different to those heretofore described and illustrated, the cam M$^5$ pressing down a spring pivoted beam or bar M$^1$, which in turn will press down the push piece C$^{33}$ onto the eyebolt and crown of the lamp. As the outer chamber revolves, a rack L$^5$ supported on a bracket on the under plate or flange of chamber B$^e$ and steadied by an arm X$^{11}$ swinging on pin X$^{10}$ will turn a gear wheel L$^6$, which in turn will operate a pinion L$^7$ carrying a guard plate L$^8$ mounted at the base of the lamp ring N$^{60}$. A contact $C^b$ is mounted below the plate $L^8$ and clear, or away from (in the normal position) the taper aperture $L^9$. The contact $C^b$ has a taper end, as shown, and when the aperture $L^9$ is, by the operation of the apparatus, turned over the contact $C^b$, said contact will pass through the aperture, and make contact with the lamp or an insulated pin in same, (Fig. 8). The spring locking device $J^6$ may be arranged in an overlapping flange $B^5$ and caused to engage notch $J^5$ in the under plate or flange of chamber $B^e$. In order that a slight resistance may be given to the complete closing of the chamber, the stationary chamber $B^{x3}$ may be provided with a spring stop $T^2$, with which a stop $T^3$ on the moving chamber $A^{x3}$ will engage, as the chambers are almost closed, and thus cause a slight rebound, Fig. $8^a$ will show this device.

Figure 10:
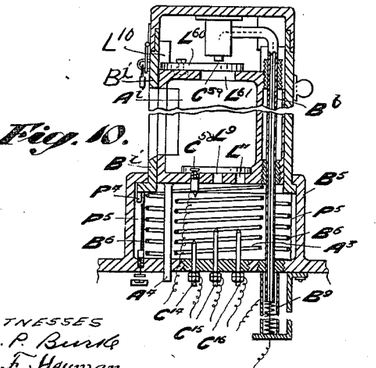
Fig. 10 represents a further form of apparatus.

Fig. 10 shows an appliance in which the lamp is placed in the chamber $A^i$, and the outer chamber $B^i$ is revolved until contacts in a lower portion of the apparatus are in line with contacts or apertures in the base plate of the inner chamber, and then pressed down, and the final contacts made, as hereinafter described. The chamber $B^i$ has formed at its base a pin or pins or the like $P^4$, which engage vertical recesses or spaces $P^5$ formed in an annular recess in the flange $B^5$. A spring $B^6$ retains the chamber in its upper position. The chamber $A^i$ is also retained in an upward position by means of spring $A^3$, and a guide bar $A^4$ is attached to chamber $A^i$ to prevent turning, but not rising and falling. The aperture $L^{61}$ in chamber $A^i$ Fig. 10 and chamber $B^1$, Fig. $3^a$ is guarded by guard plate $L^{60}$ pivoted to the top of the chamber $A^i$, and engaged by catch or projection $L^{10}$ formed on the outer chamber. Apertures $L^9$ and $L^{11}$ are formed in the base plate of chamber $A^i$, and a contact piece or push $C^{58}$ placed therein. Contacts $C^{14}$, $C^{15}$ and $C^{16}$ are arranged in the base of the apparatus. Any of the before described contact pieces or pushes $C^{59}$ or the like, are placed in the chamber $B^i$ and the wires therefrom lead into an insulated tube $B^b$ provided with a spring extending end $B^9$, to allow same to collapse as chamber $B^i$ is moved down, so as to suit varying sizes of lamps. The lamp is placed in the chamber $A^i$, and the chamber $B^i$ revolved until the pins $P^4$ are over the recess $P^5$, then the chamber $B^i$ is pressed down. The pins $P^4$ or the like will close contacts hidden in the base of recesses $P^5$. The contacts $C^{15}$ and $C^{16}$ will pass through preferably insulated apertures $L^9$ and $L^{11}$. The contacts $C^{58}$ and $C^{14}$ will meet, the door $L^{60}$ will uncover the aperture $L^{61}$ allow contact $C^{59}$ to make contact with the lamp top or lamp eyebolt or eyelet, and thus ignite the lamp. The various pushes, contacts and conductor tube may be electrically wired up in a variety of ways. In the drawing I have shown the conductor tube and the insulated conductor in same as carrying secondary and primary currents, which to complete circuit would pass from contact $C^{59}$ through the lamp and lamp eyebolt to the secondary and primary connections or contacts (in the base dish) $C^{15}$ and $C^{16}$, and so on via contacts $C^{58}$ and $C^{14}$ to the induction coil and cell respectively.

Figure 10A:
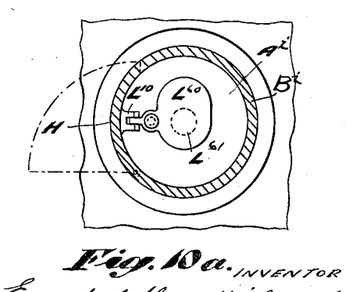
Figure 11:
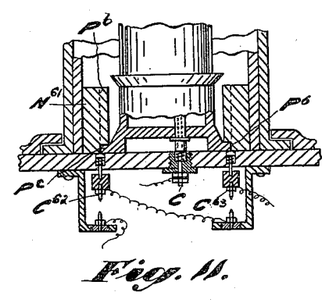
Fig. 11 represents a lamp seating ring embodying secret pushes, and a bayonet joint action.

Fig. $10^a$ shows a plan of the inner guard or door $L^{60}$. In another form, Fig. 11, the lamp ring $N^{61}$ is provided with vertical slits $P^b$, for projections $P^c$ on the lamp to enter. The said slits $P^b$ communicate with a recess $P^6$ formed in the ring $N^{61}$, containing hidden plug switches $C^{62}$ and $C^{63}$. The lamp is placed in its ring, pressed down, and partially revolved, until the contacts $C^{62}$ and $C^{63}$ are closed. This might be termed a bayonet joint form of device.

Figure 13:
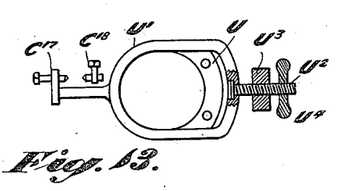
Fig. 13 represents a plan of a lamp clip or base ring.

Fig. 13 shows a device for securing the lamp in its ring, and for closing a circuit when the lamp is securely held in such clip or ring. The device comprises a fixed segment $U$, and a sliding ring or portion $U^1$ carrying an extension, on which is mounted a contact $C^{17}$ which, when the ring $U^1$ is closed against the lamp, will make contact with a push or contact piece $C^{18}$. The ring $U^1$ is drawn onto or against the lamp by means of a screw $U^2$, passing through a threaded block $U^3$. The screw $U^2$ may turn around within the block $U^3$, the turning movement being accomplished by means of a thumb screw or the like $U^4$ attached to the screw. The clips $U$ and $U^1$ will be shaped to fit the lamp vessel as shown in Fig. 9. These devices may be fitted to any of the chambers which will allow for same.

Figure 14:
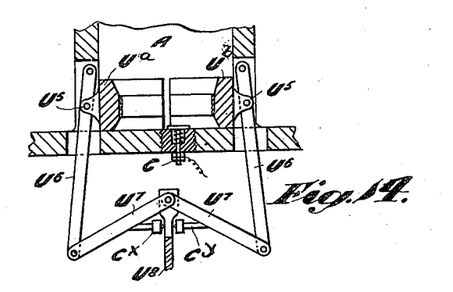
Fig. 14 represents another form of lamp clip ring and operating device.

Fig. 14 represents a form of clip ring device, in which the rings $U^a$ and $U^b$ are connected by brackets $U^5$ to pivoted levers $U^6$, which in turn are attached to links $U^7$, the links meeting in a push bar $U^8$. On the links $U^7$ are mounted terminals $C^x$ and $C^y$, and as the bar $U^8$ is pressed up, the clips $U^a$ and $U^b$ will grip the lamp, and the terminals $C^x$ and $C^y$ will meet and close the desired circuit. The push bar $U^8$ may be connected to the operating mechanism in connection with the chambers and operated by same.

Figures 15, 17:
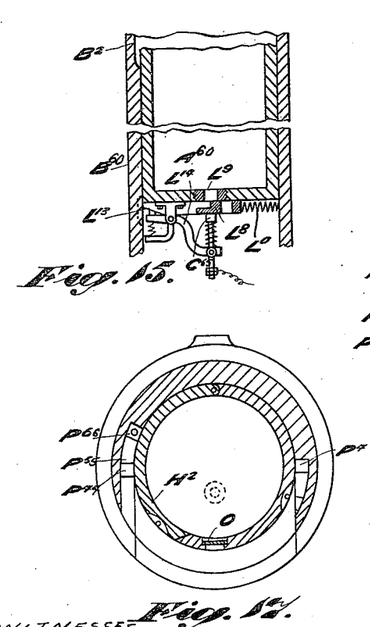
Fig. 15 represents a view of a guard plate and electric contact operating device, adapted to the base of a lamp chamber.
Figs. 16 and 17 represent sectional elevation and plan of a further form of apparatus.

Figs. $3^a$ and 15 show another form of inner guard plate $L^8$, this plate being a sliding one pressed outward by means of a spring $L^9$, but the plate is pressed against the sides of chamber $B^{60}$, and cannot slide until a recess $B^2$ is reached, either by raising the chamber $A^{60}$ or revolving same. The end $L^{13}$ of plate $L^8$ is formed taper or inclined, and in sliding passes cam-like over the end of a spring pressed pivoted lever $L^{14}$ which carries a contact piece $C^{65}$, and as the plate $L^8$ slides clear of the aperture L⁹, the lever L¹⁴ automatically passes contact C⁶⁵ through the insulated aperture L⁹ against the lamp.

Figure 16:
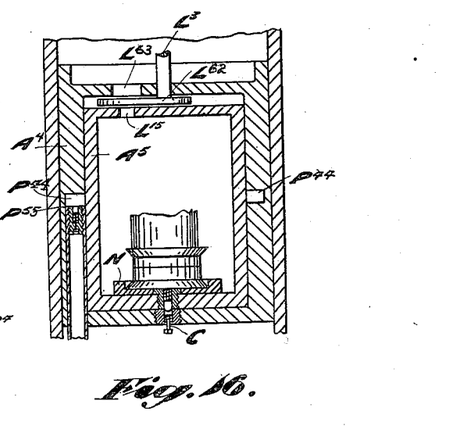

Figs. 16 and 17 show a device comprising a detachable inner chamber A⁵ into which the lamp is placed, and the said chamber is then placed into chamber A⁴. This, however, can only be accomplished when the door H² is closed. The inner guard plate L⁶² and aperture L⁶³ may be used, in this case an aperture L¹⁵ being provided in the chamber A⁵. The chamber A⁵ will be slightly shorter than the chamber A⁴, and may carry thereon lugs or pins P⁴⁴, for engaging in slots P⁵⁵ in the chamber A⁴, and the pins turned in their slits until vertical slots P⁶⁶ are reached, when the chamber A⁵ will drop some little distance downward, and the pins P⁴⁴ will press secret pushes or contacts hidden in the recesses P⁶⁶. The turning of the chamber A⁵ in the chamber A⁴ will insure the closing of the door H², said door being semi-circular, or segmental.

Figure 18:
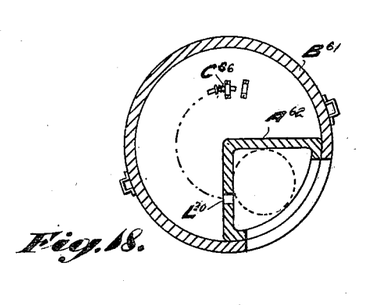
Figs. 18, 19, and 20, represent details of further forms of guard plates and pushes or contacts.
Figure 19:
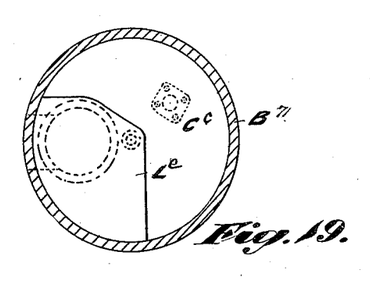
Figure 20:
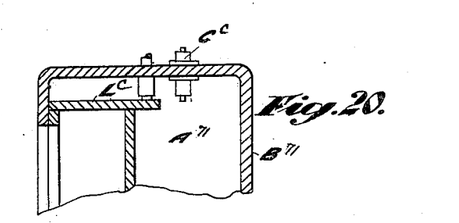

Further modified forms of apparatus with inner guards or doors are shown in Figs. 18, 19, and 20, Fig. 18 showing the chamber A⁶² mounted inside a larger and revolving chamber B⁶¹, and in the chamber B⁶¹ is mounted a contact C⁶⁶ arranged so that only when the chamber B⁶¹ is revolved can the contact C⁶⁶ enter a recess L⁷⁰ in the side of chamber A⁶² and touch a lamp therein. The process may, however, be reversed, and chamber A⁶² moved on to contact C⁶⁶. Figs. 19 and 20 show plan and elevation of a further device, in which the outer chamber B⁷¹ carries a visible push C^c. A guard plate L^c is mounted in the chamber B⁷¹, and arranged to cover the top of chamber A⁷¹ when the doors are open. The turning movement of the chamber B⁷¹ will remove the guard or cover L^c from over the lamp chamber, and the push C^c will travel to such chamber and lamp therein. The operation of the push C^c will cause a contact to be made with the lamp. The push may carry an eye bolt terminal substantially of the form hereinbefore described.

Figure 21:
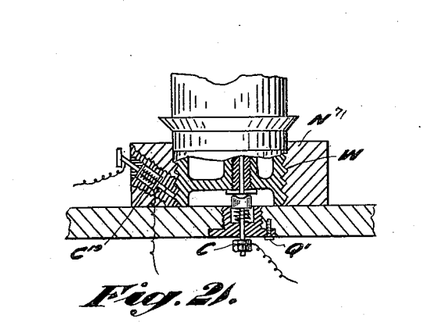
Fig. 21 represents a screw form of base ring and contacts.

Figs. 3ª and 21 show a device in which the lamp ring N⁷¹ is threaded and the lamp vessel provided with an external screw thread W for engaging the threaded ring N⁷¹. As the last thread on the lamp vessel passes into the lowest thread in ring N⁷¹, a switch C¹⁹ concealed therein will be operated. In this form Fig. 21 I have shown a method of preventing the unauthorized withdrawal of the insulator in the base dish of the apparatus, a stud or the like Q¹ screwed to the underside of the base dish after the insertion of the insulator preventing the unscrewing of the insulator, the stud having been passed through the flange of the insulator.

Figure 31:
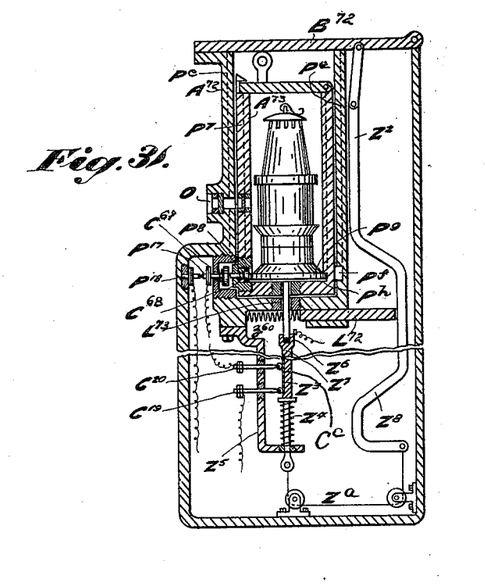
Figs. 31 and 32, represent elevation and a detail of an apparatus embodying secret pushes wherein a subsidiary lamp chamber may be used.
Figure 32:
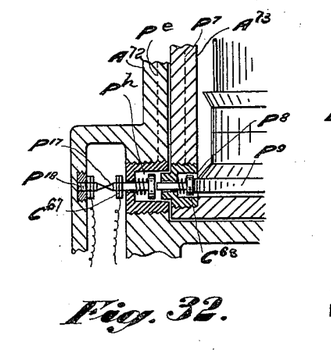

Figs. 31 and 32 show a further form in which a chamber A⁷² is provided with vertical slots or grooves P^e for the reception of one or more lugs P^f, on a subsidiary chamber A⁷³ into which a lamp to be ignited is placed. The grooves P^e terminate in preferably curved horizontal grooves P^h, and a push member C⁶⁷ is hidden in one or more of these grooves. The chamber A⁷³ is provided with a similar arrangement of grooves P⁷ and P⁸ to receive the foot of the lamp or lugs or projections P⁹ formed thereon, and a push member or switch C⁶⁸ is hidden in the groove P⁸. The chamber A⁷³ is placed in chamber A⁷² and turned until push members C⁶⁷ and C⁶⁸ are in alinement. A further slight movement of the chamber causes switch members or contacts P¹⁷ and P¹⁸ to meet. The details of this switch are somewhat like that shown in Fig. 29. The hinged or swivel door B⁷² is then closed. A link is connected to a cranked guard rod Z² and door B⁷², which allows a spring actuated guard plate L⁷² to clear the aperture L⁷³ formed in the base of chambers A⁷² and A⁷³ when a contact piece or bar Z³ is by its spring Z⁴ pressed upward to make contact with the lamp. A bracket Z⁵ carries the bar Z³, and a cord Z^a connects the rod Z² to the bar Z³. Such bar may be divided at Z⁶ by an insulated portion Z⁷, a spring $z^{c0}$ holding the parts asunder, such parts being caused to meet by the upward thrust of rod Z³ and the resistance of the lamp, and as the divided parts are insulated one from the other, a wire in the electric circuit is attached to the upper or uninsulated part of bar Z³. On the insulated portion of bar Z³ is formed a contact piece C^e and contacts C¹⁹ and C²⁰ make contact on such portion when the lamp is ready for lighting. As the door B⁷² is opened, the cord Z^a draws the switch member or bar Z³ down and the sloping portion Z⁸ of rod Z² pushes the guard L⁷² across the opening L⁷³.

Figure 28:
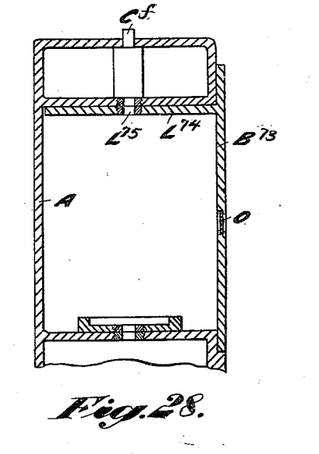
Fig. 28 represents a further form in which an outer visible push is employed.

Fig. 28 shows a form of device provided with a door B⁷³ carrying a guard L⁷⁴ and aperture L⁷⁵ arranged to allow a visible push member or mechanism C^f to be operated only when the door is closed.

Figure 30:
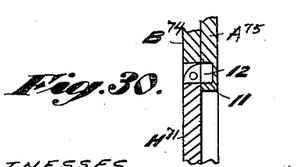
Fig. 30 shows form of automatically operated guard to the lamp admittance door of the outer chamber or door.

Fig. 30 shows a method of automatically closing a guard in the lamp admittance opening H⁷¹ in the outer chamber B⁷⁴, upon the operation of the apparatus. The door H⁷¹ is suitably hinged or pivoted to chamber B⁷⁴, and provided with a squared off portion 11 at the other side of the hinge or pivot, so arranged that only when the lamp admittance door of the inner chamber A⁷⁵ arrives in the "open" position, will a recess 12 in such chamber arrive in such a position as to allow the squared off portion 11 of the guard H⁷¹ to enter the said recess and the guard to be opened. The operation of the chambers would immediately cause the recess 12 to move away and the plain framework of chamber A⁷⁵ to automatically close guard H⁷¹.

Figure 35:
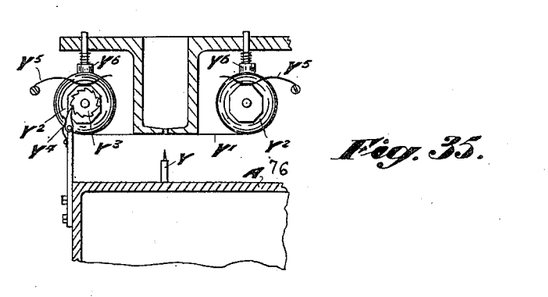
Figs. 35 and 36 represent views of automatic recording devices.
Figure 36:
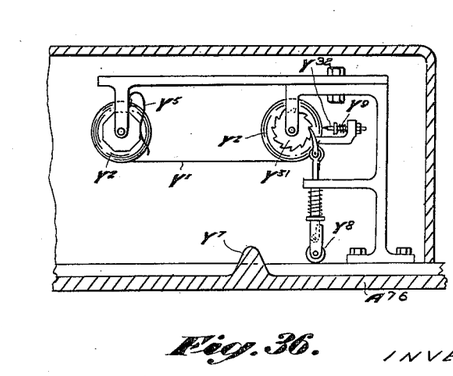

In order to keep a check upon the number of times the apparatus has been operated in a given time, a sheet or roll of paper, and pencil or like marking device may be attached to the operating mechanism, the operation of the apparatus in the one direction causing a fresh portion of paper to come opposite the marking device, while the return operation causes the "marker" to suitably mark the paper. Two forms of apparatus for accomplishing this purpose are shown in Figs. 35 and 36, Fig. 35 showing a pencil or pricker Y, carried on a moving portion of the apparatus such as A⁷⁶, for marking or punching a paper Y¹ carried on drums Y², on one of which is a ratchet Y³, operated by a spring pawl Y⁴ carried by the moving portion of the apparatus. Check springs Y⁵ and Y⁶ are carried for the purpose of steadying the drums and compensating for the varying diameters of the drums. Fig. 36 which is embodied in Fig. 3ᵃ shows a moving portion of the apparatus carrying a cam Y⁷ engaging with, on the movement of the apparatus, a trip cam bowl Y⁸ operating ratchet Y³¹, the pencil Y³² being mounted on a spring rod Y⁹.

Figure 26:
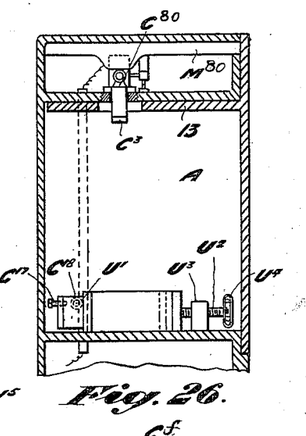
Figs. 26 and 27 represent in elevation and plan one form of rectangular chamber having hinged door and inner push aperture guard.
Figure 27:
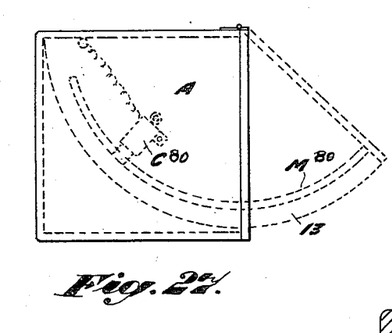

Figs. 26 and 27 represent a form of hinged lamp chamber door, having an inner guard 13 connected thereto in such a manner that only when the chamber door is closed will an aperture in the inner guard come in line with a corresponding electric push arranged in the walls of the apparatus, so that such push may be pressed forward into contact with the lamp. This apparatus may be provided with a cam rod M⁸⁰ to operate a switch member C⁸⁰ of any suitable type, such as a plain push, eyebolt switch, or otherwise. The lamp ring is shown in the form of the clamping device U hereinbefore described.

Figure 33:
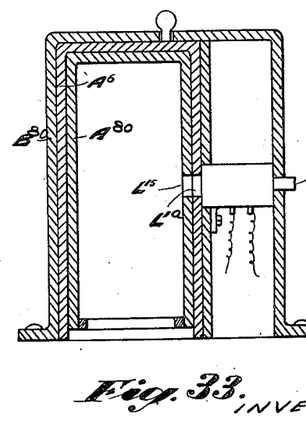
Fig. 33 represents a form of apparatus provided with a guarded push operated from the side.

Fig. 33 shows a form of apparatus in which the push is operated from the side, through an aperture L'ᵃ in the lamp chamber, after the inner guard plate has been made clear. In the figure I have shown a fixed inner lamp chamber A⁸⁰, and a fixed outer chamber B⁸⁰, the inner guard A⁶ sliding or revolving between the two, the lamp admittance openings in the inner lamp chamber and outer chamber would always coincide; the inner guard plate also being furnished with a lamp admittance opening, which after the insertion of the lamp must be moved so that the lamp chamber is completely closed and rendered flame tight in order to bring the push aperture on the inner guard plate in line with the push or contacts arranged in the side walls. It will, however, be obvious that this side wall push and guard may be employed in the forms where the outer or inner chambers are given a motion.

To keep down the number of figures, I have adopted the plan of showing on each figure a variety of the modifications, and I would therefore have it understood that I do not confine myself to the particular forms shown in each figure, but may delete or recombine any of the forms set forth, as may be necessary to obtain the most satisfactory results.

What I claim as my invention is:—

1. An apparatus for igniting miners' safety lamps, comprising outer and inner chambers having lamp admission openings therein, one of said chambers being movable in relation to the other so as to close the openings, and an electric contact operated at the end of the closing movement to light the lamp.

2. An apparatus for igniting miners' safety lamps, comprising outer and inner chambers having lamp admission openings therein, one of said chambers being movable in relation to the other so as to close the openings, an electric contact operated at the end of the closing movement to light the lamp, and means for preventing access to said contact when the chambers are opened.

3. An apparatus for igniting miners' safety lamps, comprising outer and inner chambers having lamp admission openings therein, one of said chambers being movable in relation to the other, so as to close the openings, an electric contact operated at the end of the closing movement to light the lamp, a guard plate normally covering said contact, and means operated by the closing movement for moving the guard plate away from the contact.

4. An apparatus for igniting miners' safety lamps, comprising outer and inner chambers having lamp admission openings therein, means for moving one chamber in relation to the other to close said openings, an electric contact operated at the end of the closing movement to light the lamp, a door normally separating the inner chamber from the contact, and means operated by the closing movement of the chambers to move said door.

5. An apparatus for igniting miners' safety lamps, comprising outer and inner chambers having lamp admission openings therein, one of said chambers being movable in relation to the other, an electric contact operated at the end of the closing movement to light the lamp, a guard plate normally covering the contact, means operated by the closing movement for removing said plate, a door normally separating the lamp chamber from the contact, and means operated by the movement of the chamber to actuate said door.

6. An apparatus for igniting miners' safety lamps, comprising a lamp chamber adapted to receive the lamp, means for closing said chamber, a guard plate operated by said means and an electric contact covered by said guard plate when said chamber is in open position.

7. An apparatus for igniting miners' safety lamps, comprising an outer chamber, an inner chamber adapted to receive the lamp, means for moving the inner chamber, means for automatically closing the inner chamber, internal guard doors actuated by the movement of the inner chamber, an electric contact operated by the lamp at the end of the closing movement, a guard plate normally covering said contact, and means for operating the guard plate to uncover the contact.

8. An apparatus for igniting miners' safety lamps, comprising an outer chamber, an inner chamber adapted to receive the lamp, means for moving the inner chamber, means for automatically closing the inner chamber, internal guard doors actuated by the movement of the inner chamber, an electric contact operated by the lamp at the end of the closing movement, a guard plate normally covering said contact, means for operating the guard plate to uncover the contact, and means for automatically recording the number of times the device is used.

9. An apparatus for igniting miners' safety lamps, comprising an outer chamber, an inner chamber adapted to receive the lamp, means for moving the inner chamber so as to close the lamp admission opening, an electric contact adapted to be engaged by the lamp when the inner chamber is moved to closed position, and automatically operated doors normally separating the contact from the inner chamber.

10. An apparatus for igniting miners' safety lamps, comprising an outer chamber, an inner chamber adapted to receive the lamp, means for moving the inner chamber, said chambers having lamp admission openings therein, electric contacts in the outer chamber, means for moving the inner chamber to close the openings and to bring the lamp in engagement with said contacts to light the lamp, and means operated by the movement of the inner chamber for preventing access to the contact when the inner chamber is open.

11. An apparatus for igniting miners' safety lamps comprising an outer and an inner chamber having lamp admission openings therein, electric contacts in the outer chamber, means for moving the inner chamber to close the openings and to bring the lamp into engagement with said contacts to light the same, and doors on the top of the inner chamber automatically operated by the movement of said chamber.

12. An apparatus for igniting miners' safety lamps, comprising outer and inner chambers having lamp admission openings therein, electric contacts in the outer chamber, means for moving the inner chamber to close the openings and to bring the lamp into engagement with the contacts to light the same, and means for locking the chamber against movement.

13. An apparatus for igniting miners' safety lamps, comprising outer and inner chambers having lamp admission openings therein, electric contacts in the outer chamber, means for moving the inner chamber to close the openings and to bring the lamp into engagement with said contacts to light the same, and coin controlled means for locking the chamber against movement.

14. An apparatus for igniting miners' safety lamps, comprising outer and inner chambers having lamp admission openings therein, an electric contact in the outer chamber, means for moving one of said chambers to close the said openings, means operated by said movement for moving the contact into position where it can be engaged by the lamp to light said lamp, means covering said contact when the inner chamber is open, and means for uncovering said contact on the closing movement of the chamber.

15. An apparatus for igniting miners' safety lamps, comprising outer and inner chambers, having lamp admission openings therein, electric contacts in the outer chamber, means for moving the inner chamber to close the openings and to bring the lamp into engagement with the contacts to light the same, a door separating the contacts from the inner chamber, a contact at the bottom of the inner chamber, and means for moving the door and operating the bottom contact when the chamber is moved.

16. An apparatus for igniting miners' safety lamps, comprising a lamp chamber, an outer chamber, said chambers having lamp admission openings therein, and means for simultaneously raising the lamp chamber and revolving the same to close said opening.

17. An apparatus for igniting miners' safety lamps, comprising a lamp chamber, an outer chamber, said chambers having lamp admission openings therein, means for moving one chamber in relation to the other to close said openings, and hidden electric contacts automatically operated by the closing movement.

18. An apparatus for igniting miners' safety lamps, comprising an outer chamber, an inner lamp receiving chamber, said chambers having lamp admission openings therein, a rack and pinion for raising and lowering said lamp chamber to close said openings, electric contacts in the outer chamber adapted to be engaged by the lamp when the chamber is raised, and means operated by the movement of the chamber for covering said contacts when the lamp admission openings are uncovered.

19. An apparatus for igniting miners' safety lamps, comprising an outer chamber, an inner chamber adapted to receive a lamp, said chambers having lamp admission openings therein, an electric contact in the outer chamber adapted to engage with one part of the lamp and another contact adapted to engage with another part of the lamp, and means for moving the inner chamber to close the openings and to bring the lamp into engagement with said contacts.

20. An apparatus for igniting miners' safety lamps comprising an outer chamber, an inner chamber adapted to receive the lamp, said chambers having lamp admission openings therein, an electric contact in the outer chamber, a movable electric contact in said outer chamber, means for moving said movable contact, and means for moving the inner chamber to close the openings and to bring the lamp into engagement with said contacts.

21. An apparatus for igniting miners' safety lamps, comprising an outer chamber, an inner chamber adapted to receive the lamp, said chambers having lamp admission openings therein, a stationary electric contact in the outer chamber, doors normally separating the inner chamber from said contact, a movable contact located above the stationary contact, a guard plate normally covering said movable contact, means for moving the guard plate and for lowering the movable contact, and means for raising the inner chamber to close the openings and to move the doors and to bring the lamp into engagement with the contacts.

22. An apparatus for igniting miners' safety lamps, comprising outer and inner chambers, means for moving the inner chamber, an electric circuit closed by the lamp on the movement of said chamber, and a detachable cover for the outer chamber.

23. An apparatus for igniting miners' safety lamps, comprising an outer chamber, an inner chamber adapted to receive the lamp, electric contacts in the outer chamber, and means for moving the inner chamber so that when a lamp of a predetermined size is placed therein said lamp will engage with the contacts so as to light the same.

In witness whereof, I have hereunto set my hand in the presence of two witnesses.

ERNEST ARTHUR HAILWOOD.

Witnesses:
CLIVE WAUGH,
JOSEPH P. KIRBY.

Copies of this patent may be obtained for five cents each, by addressing the "Commissioner of Patents, Washington, D. C."